United States Patent [19]

Takao et al.

[11] 4,004,211
[45] Jan. 18, 1977

[54] COMPOUND AC GENERATOR

[75] Inventors: Masaki Takao, Hitachi; Hideo Tatsumi, Mito, both of Japan

[73] Assignee: Hitachi, Ltd., Japan

[22] Filed: Feb. 3, 1976

[21] Appl. No.: 654,908

[30] Foreign Application Priority Data

Feb. 10, 1975 Japan .............................. 50-16227

[52] U.S. Cl. .................................. 322/63; 322/64; 310/184; 310/188
[51] Int. Cl.² .......................................... H02P 9/10
[58] Field of Search .................. 322/59, 62, 63–66; 310/184–188; 320/65

[56] References Cited
UNITED STATES PATENTS

| 3,109,978 | 11/1963 | Baumann | 322/63 X |
| 3,435,325 | 3/1969 | Laudel, Jr. | 322/63 X |

Primary Examiner—Robert J. Hickey
Attorney, Agent, or Firm—Craig & Antonelli

[57] ABSTRACT

In a compound AC generator having at least one pair of magnetic poles, series field windings wound on the magnetic poles, respectively, and at least one shunt field winding wound on at least one of the pair of magnetic poles in layers with the series field winding wound thereon, the series field winding wound in layers with the shunt field winding is associated with means for blocking the current flow through the series field winding in a direction to increase the magnetic fluxes through the associated magnetic pole thereby to minimize the effects of pulsating field current through the shunt field winding and to stabilize the output of the generator.

3 Claims, 8 Drawing Figures

FIG. 3
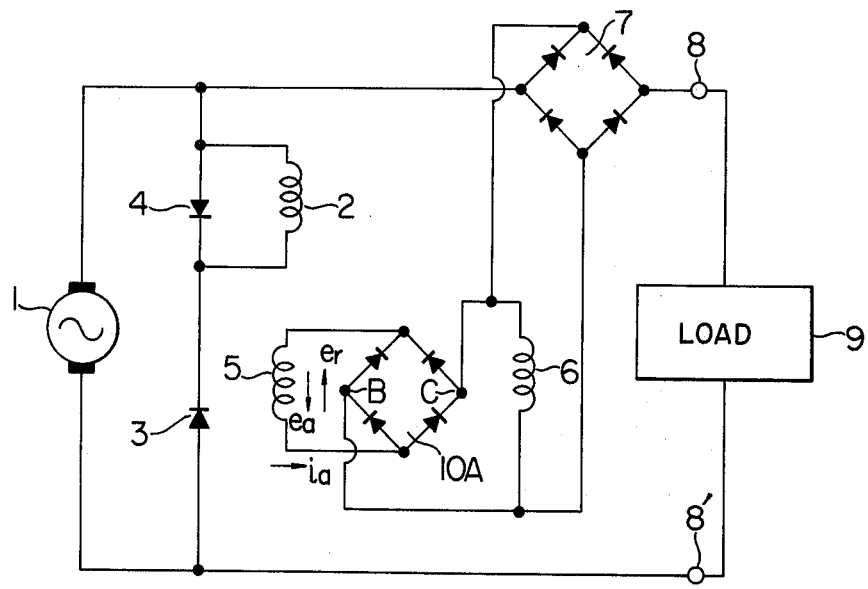
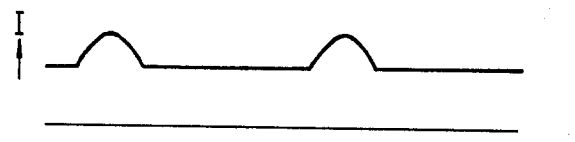
FIG. 4A
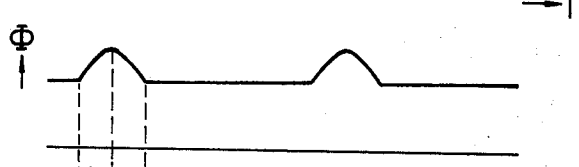
FIG. 4B
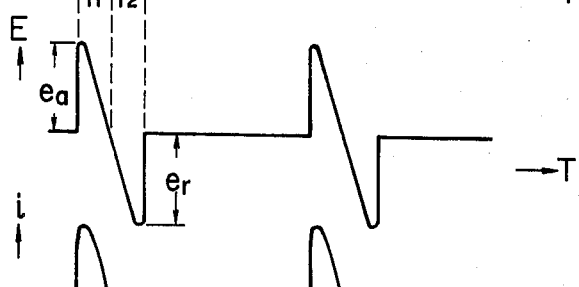
FIG. 4C
FIG. 4D

COMPOUND AC GENERATOR

BACKGROUND OF THE INVENTION

1. Field of the Invention

The present invention relates to a compound AC generator and, more particularly, to a compound AC generator having a control circuit so designed as to prevent the voltage pulsation in a shunt field winding from affecting a series field winding.

2. Description of the Prior Art

In general, a compound AC generator requires arrangement of its series field winding to have (1) a large diameter of the wire, (2) a large number of turns, and (3) to be divided into parallel circuits, in order to enhance the compensation for drooping of the terminal voltage of the generator due to overload. When using such a series field winding, however, the space occupied by the series field winding is larger than that of the shunt field winding, resulting in necessity of disposing the series and shunt field windings on a common magnetic pole. The series field winding is wound to be distributed uniformly on magnetic poles in order to reduce the resistance of the field winding, to reduce the heat evolved and to prevent nonuniform magnetic flux distribution. The shunt field winding is connected through a half-wave rectifier to the generator to receive a half-wave rectified field current and a flywheel diode is connected in parallel to the shunt field winding to prevent interruption of the field current during another half-cycle, whereby the shunt field winding is supplied with a pulsating field current without interruption, resulting in pulsating magnetic flux produced by the shunt field winding. This causes an exciting current to flow in a direction to increase the magnetic fluxes through the series field winding wound on the same magnetic pole in layers with the shunt field winding, resulting in variation of the output voltage of the generator. The effects of the variation of the output voltage is especially great at a light load and its voltage regulation is about 15%, thereby presenting poor performance as a power source.

SUMMARY OF THE INVENTION

It is, accordingly, an object of the present invention to provide a compound AC generator with a possibly small voltage variation and an excellent compensation for the terminal voltage dropping appearing during an overload.

Another object of the present invention is to provide a compound AC generator as above-mentioned with a simple and practical circuit construction.

The present invention has features in that the variation of the output voltage is restricted to a possibly small value without unfavourable affect on the voltage dropping compensation characteristic during an overload.

According to the present invention, a compound AC generator having at least one pair of magnetic poles, series field windings wound on the magnetic poles, respectively, and at least one shunt field winding wound on at least one of the magnetic poles and in layers with the shunt field winding wound thereon is arranged such that the series field winding, which is in layers with the shunt field winding, is associated with means for blocking the current flow through the series field winding in a direction to increase the magnetic fluxes through the associated magnetic pole, thereby to minimize the effects of pulsating voltage developed in the field winding and to stabilize the output of the generator.

These and other more specific objects will be understood from the following description with reference to the accompanying drawings.

BRIEF DESCRIPTION OF THE DRAWINGS

FIG. 3 is a schematic circuit diagram of another embodiment of a control circuit for controlling the compound AC generator according to the present invention.

FIGS. 4A to 4D illustrate waveforms at the respective points of the control circuits of the embodiments.

DESCRIPTION OF THE PREFERRED EMBODIMENTS

Figure 1:
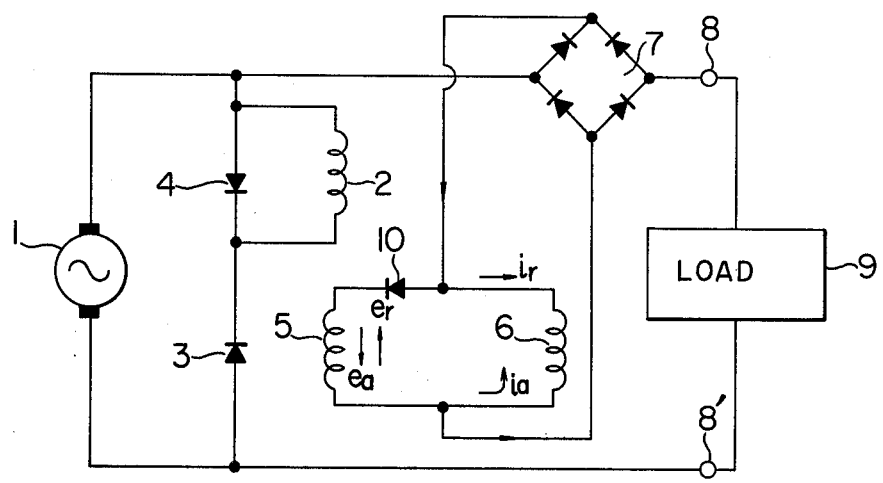
FIG. 1 is a schematic circuit diagram of an embodiment of a control circuit for controlling a compound AC generator according to the present invention.
Figure 2:
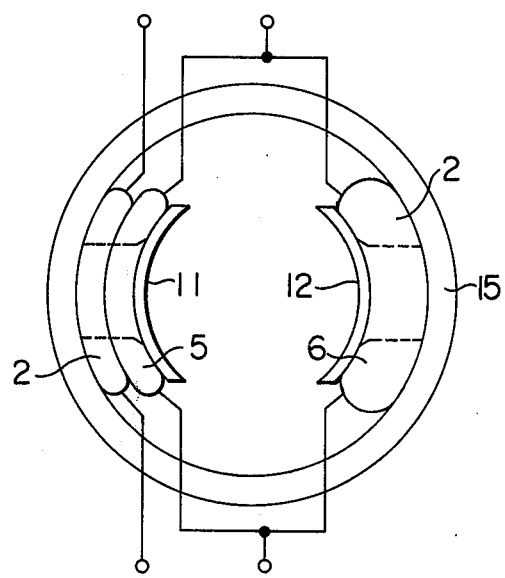
FIG. 2 illustrates an arrangement of the field windings of the generator.

In FIG. 1, reference numeral 1 designates an armature, and 2 a shunt field winding which is excited by the current rectified through a combination of a diodes 3 and a flywheel diode 4. Reference numerals 5 and 6 denote series field windings, respectively, connected in parallel to each other, and the connecting points of the parallel circuits are connected to the terminal of the armature through a diode bridge 7 constituting a full wave rectifier circuit. Reference numerals 8 and 8' designate output terminals both coupled with a load 9. Reference numeral 10 designates a diode for blocking the current in a direction to increase magnetic fluxes through the associated magnetic pole. The arrangement of installed coils mentioned above will be described with reference to FIG. 2 in which reference numeral 15 is representative of a yoke with magnetic poles 11 and 12 integral therewith. On one of the magnetic poles 11 is wound a shunt field winding 2 in layers with the series field winding 5, while only the series field winding 6, which is connected in parallel to the series field winding 5, is wound on the other magnetic pole 12.

It is to be noted here that the series field windings 5 and 6 are wound on the corresponding magnetic poles 11 and 12, respectively, in order to reduce the whole resistance of the windings and to reduce heat production. With such construction, the field current flowing through the shunt field winding 2 includes a half-wave rectified current through the diode 3 during one half-cycle and a current through the flywheel diode 4 during another half-cycle. More particularly, the field current takes a form of pulsating current, as shown in FIG. 4A. Accordingly, the flux developed by the shunt field winding 2 also pulsates, as shown in FIG. 4B. During the period of time $T_1$ in FIG. 4B, the intensity of the magnetic flux increases with time and thereby the shunt field winding 5 induces a voltage $e_a$ in a direction to prevent the increase of the magnetic flux. On the other hand, during the period of time $T_2$, the intensity of the magnetic flux decreases with time thereby to induce in the shunt field winding 5 a voltage $e_r$ in a direction to prevent the decrease of the magnetic flux. The time $T_2$ is substantially equal to the time $T_1$ and the rate of variation of the magnetic flux during the time $T_1$ is substantially symmetrical with that during the time $T_2$. Thus, the voltage $e_a$ is substantially equal in amplitude and opposite in direction to the voltage $e_r$, as shown in FIG. 4C.

The induced voltage $e_a$ produces a current $i_a$ through the series field winding 6, as well as a current flowing through the rectifier bridge 7. The current $i_a$ is given as $$i_a = \frac{1}{r_5 + r_6 + \frac{r_5 \cdot r_6}{r_7}} e_a$$

where $r_5$ and $r_6$ indicate the resistances of the series windings 5 and 6, respectively and $r_7$ the resistance of the rectifier bridge 7.

The rectifier bridge blocks the current flow therethrough due to the induced voltage $e_r$. However, if the diode 10 were omitted, the induced voltage $e_r$ would produce a current $i_r$ flowing through the loop of the series field windgs 5 and 6. The current $i_r$ is given by $$i_r = \frac{e_r}{r_5 + r_6}$$

As abovementioned, since $e_a = e_r$ and hence $i_r > i_a$, the resultant current flowing through the series field winding 6 would be $i_r - i_a$ and flow in a direction to increase the magnetic flux in the series field winding 6.

The diode 10 is effective to prevent the current flowing through the series winding 6 due to the induced voltage $e_r$. In other words, the diode 10 is connected in such a direction so to block a current flow which will otherwise be produced by the voltage induced in one of the series field windings 5 and flow through the other series field winding 6 in a direction to increase the magnetic flux in the other series field winding. For this reason, when pulsating magnetic flux is developed by the shunt field winding 2 and, hence, an alternating electromotive force, or voltage, is induced in the series field winding 5 disposed on the same magnetic pole, the current flowing through the series field winding 5 includes only the current $i_a$, as shown in FIG. 4D, in such a direction as to reduce the magnetic flux produced by the series field winding 6. Therefore, it is possible to restrict the voltage rise across the output terminals at a light load thereby resulting in a considerable improvement of the voltage regulation. FIG. 3 shows another embodiment of the instant invention. In the figure, series field windings 5 and 6 are connected to each other through a diode bridge circuit 10A. With such a circuit construction, when the voltage induced in the series field winding 5 is directed in the direction of $e_r$, no current flows due to the action of the bridge circuit 10A. On the other hand, the voltage induced in the series field winding 5 takes a direction designated by $e_a$, the current $i_a$ flows through the bridge circuit 10A while no current flows through the series field winding 6 coupled across two connecting points B and C since the potentials at the points B and C are equal. As a result, the induced voltage in the series field winding 5 has no effects to increase the magnetic flux and thus it is possible to prevent the voltage rise at a light load.

Figure 5:
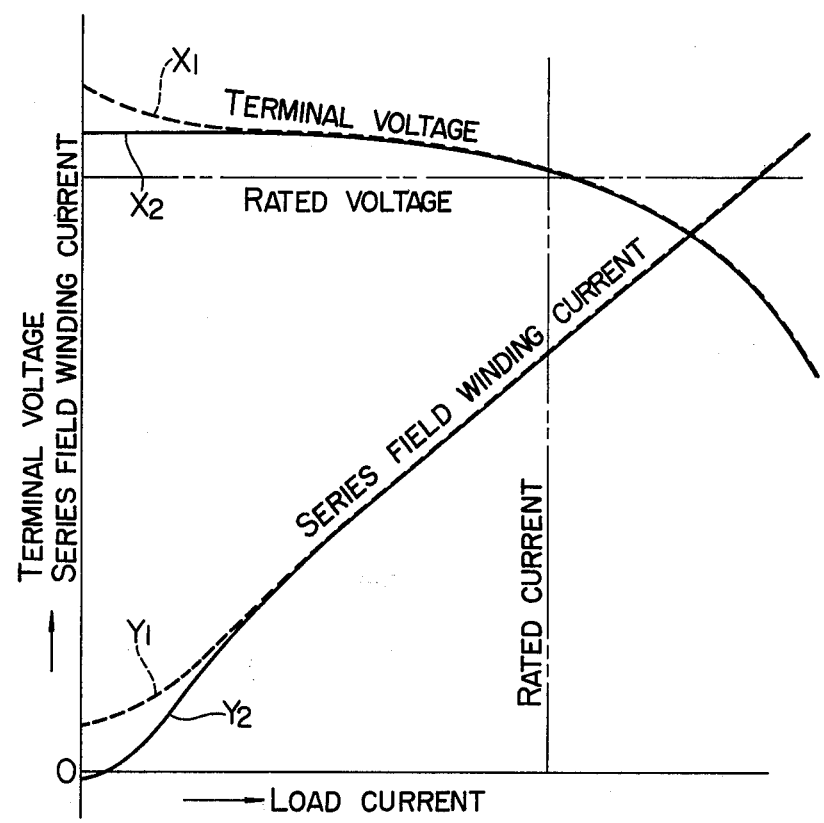
FIG. 5 shows characteristic curves of terminal voltage and series field winding current versus load current.

Reference is now made to FIG. 5 illustrating an example of the current variation of the series field winding with respect to the load current change of a 50 Hz, 100 V, and 1.5 KVA AC generator. As seen from the figure, the current in the series field winding of the compound wound AC generator of the present invention traces a solid line $Y_2$ whereas that of the conventional one a dotted line $Y_1$. That is, there is observed a reduction of the field winding current at a light load. It is also seen from the figure that the curve $X_1$ representing the variation of the terminal voltage with change of the load current for the conventional generator is improved to a shape of curve $X_2$ for the present invention, and thus the voltage rise across the terminal voltage at a light load is restricted. Listed below are measurements of the relationship between the terminal voltage vs. the load current.

|  | No load (0A) | 50% rated load (10A) | Rated load (20A) | 125% rated load (25A) | Voltage regulation |
|---|---|---|---|---|---|
| Prior Art | 115V | 107V | 101V | 92V | 13.9% |
| Present invention | 107V | 107V | 101V | 92V | 5.9% |

It will be seen from the table that, in an AC generator of the present invention, there is no reduction of the output voltage at light road without reduction of the output voltage at heavy or overload, or as maintaining the characteristics of compensation for the voltage droop at heavy or overload.

As clear from the above description, in the present invention, the current block means 10 or 10A is provided to block a current which will otherwise be produced by a voltage induced into one of the series field windings due to a field current flowing through a shunt field winding which is wound in layers with the one series field winding on one of the magnetic poles and flow through the other series field winding in a direction to increase the magnetic flux in the other series field winding.

Thus, it will be clear that, if both of the series field windings are wound in layers with shunt field windings, respectively, wound on the respective magnetic poles, the same effects will be achieved by providing such current block means in each of the parallel circuits of the series field windings 5 and 6.

Further, the embodiments of the present invention have been described with reference to a compound motor having a pair of magnetic poles, but it will be also clear for those skilled in the art that the present invention is applicable to a compound motor having two or more pairs of magnetic poles.

As described above, according to the present invention, it is possible to prevent the current during a light load in the series field winding, which is provided for compensating for the voltage drooping during heavy or overload. The result is that the voltage regulation is considerably improved during not only heavy or overload, but also light load, by maintaining the voltage drooping compensation characteristic at any load condition.

We claim:
1. In a compound AC generator comprising at least one pair of magnetic poles, series field windings wound on said magnetic poles, respectively, circuit means for connecting said series field windings in parallel to permit a load current of said generator to branch into parallel flowing paths therethrough, and a shunt field winding wound on at least one of said magnetic poles and in layers with the series field winding wound thereon, the improvement which comprises current block means provided in said circuit means so as to block the current flow through any one of said series field windings in a direction to increase the magnetic flux in said one series field winding due to a voltage induced into the other series field winding when a pulsating voltage is developed in the shunt field winding in layers with said other series field winding.

2. The improvement according to claim 1, wherein said current block means includes a diode connected in series with said other series field winding.

3. The improvement according to claim 1, wherein said blocking means includes a diode bridge circuit connected in series with said other series field winding.

* * * * *